(12) United States Patent
Hatav

(10) Patent No.: US 10,107,630 B2
(45) Date of Patent: Oct. 23, 2018

(54) DRIVER ALERT SYSTEM

(76) Inventor: Nuriel Hatav, Ashkelon (IL)

(*) Notice: Subject to any disclaimer, the term of this patent is extended or adjusted under 35 U.S.C. 154(b) by 0 days.

(21) Appl. No.: 12/498,843

(22) Filed: Jul. 7, 2009

(65) Prior Publication Data
US 2010/0007523 A1 Jan. 14, 2010

(51) Int. Cl.
G01C 21/26 (2006.01)
G01C 21/36 (2006.01)
G08G 1/052 (2006.01)
G08G 1/0967 (2006.01)
G08G 1/16 (2006.01)

(52) U.S. Cl.
CPC ......... G01C 21/26 (2013.01); G01C 21/3697 (2013.01); G08G 1/052 (2013.01); G08G 1/09675 (2013.01); G08G 1/096783 (2013.01); G08G 1/096791 (2013.01); G08G 1/166 (2013.01); G08G 1/167 (2013.01); G08G 1/16 (2013.01)

(58) Field of Classification Search
CPC .... G01C 21/26; G01C 21/3697; G08G 1/052; G08G 1/09675; G08G 1/096783; G08G 1/096791; G08G 1/166; G08G 1/167; G08G 1/16
See application file for complete search history.

(56) References Cited

U.S. PATENT DOCUMENTS

| 5,819,198 A | 10/1998 | Peretz |
| 5,952,941 A | 9/1999 | Mardirossian |
| 6,166,658 A | 12/2000 | Testa |
| 6,370,475 B1 | 4/2002 | Breed et al. |
| 6,487,500 B2 * | 11/2002 | Lemelson et al. ............ 701/301 |
| 2005/0187701 A1 * | 8/2005 | Baney .......................... 701/117 |
| 2007/0222638 A1 * | 9/2007 | Chen ..................... G08G 1/095 340/901 |
| 2009/0138159 A1 * | 5/2009 | Ewerhart et al. ............... 701/45 |

FOREIGN PATENT DOCUMENTS

| EP | 1156461 A2 | 11/2001 |
| JP | 2000337898 A | 12/2000 |
| WO | WO 2006122856 A1 * | 11/2006 ......... B60R 21/0132 |

* cited by examiner

Primary Examiner — Mohamed Barakat
(74) Attorney, Agent, or Firm — The Roy Gross Law Firm, LLC; Roy Gross

(57) ABSTRACT

A driver alert system is carried by a motor vehicle and alerts a driver that he has committed or is about to commit a driving or parking violation, or that the driving conditions are liable to result in damage to a motor vehicle or person.

24 Claims, 16 Drawing Sheets

DRIVER ALERT SYSTEM

This application contains the same subject matter as Israeli Patent No. 154873 issued Jul. 8, 2008, the contents of which are incorporated herewith.

FIELD OF THE INVENTION

The present invention relates to the field of monitoring systems. More particularly, the invention relates to a monitoring system carried by a motor vehicle for warning a driver of excessive speed or irresponsible driving conditions.

BACKGROUND OF THE INVENTION

Numerous systems for monitoring traffic violations are known in the prior art. For example, U.S. Pat. No. 5,952,941 discloses a satellite based system that determines the location of a vehicle, and compares the received information with stored roadmap information to determine on which road the vehicle is traveling and to determine the speed limit of said road, as well as the location of red light along said road. A controller in the vehicle determines the occurrence of a traffic violation such as whether the speed limit of the road on which the vehicle is traveling is being exceeded by the vehicle, and if so, a transmitter on the vehicle transmits a signal to a satellite indicative of the violation. The satellite then forwards the signal to a motor vehicle department so that a ticket may be issued. Although such a system is effective in monitoring traffic violations, the driver of the vehicle is not alerted when the speed limit is exceeded or when the vehicle is driven in an irresponsible fashion. If a driver were alerted during irresponsible driving conditions, many injuries and fatalities caused by such irresponsible driving conditions could be avoided.

U.S. Pat. No. 5,819,198 discloses a device and system for monitoring speed limit violations of a driver. Traffic signs are provided with transmitters which broadcast a speed limit signal. The monitoring device has a receiver which is capable of receiving the transmitted signal, and digitized voice messages provide a warning as to the driving conditions and speed. A record may be made of all violations for monitoring purposes. The drawback of such a monitoring system is that a driver can be alerted only after a speed limit violation, and not by any other violation, is sensed, such as passing through an intersection during a red light. Also, a driver cannot be warned when his instantaneous driving conditions will result in a traffic violation, e.g. the instantaneous speed of the vehicle without braking is such that the vehicle will pass through an intersection associated with a traffic light that is about to change to red, or are liable to result in damage to the vehicle being driven.

Furthermore, the system does not monitor the instantaneous driving conditions based on topographical road conditions, e.g. the existence of potholes or whether the road is sloped, and on meteorological data, e.g. whether it is raining and the road is slippery.

Other relevant prior art is disclosed in EP 1 156 461, U.S. Pat. No. 6,166,658, U.S. Pat. No. 6,370,475, and JP 2000337898.

It is an object of the present invention to provide a monitoring system for alerting a driver when the local speed limit is exceeded or is about to be exceeded.

It is another object of the present invention to provide a monitoring system for alerting a driver when other types of traffic or parking violations are committed or about to be committed.

It is another object of the present invention to provide a monitoring system for alerting a driver when the vehicle is driven in an irresponsible fashion.

It is an additional object of the present invention to provide a monitoring system for alerting a motor vehicle authority or the parents of a driver when a traffic violation is committed or when the vehicle is driven in an irresponsible fashion.

It is an object of the present invention to provide a monitoring system for alerting a driver when the instantaneous weather and/or road topographical conditions are such that are liable to result in damage to the vehicle being driven.

Other objects and advantages of the invention will become apparent as the description proceeds.

SUMMARY OF THE INVENTION

The present invention provides a driver alert system carried by a motor vehicle for alerting a driver that he has committed or is about to commit a driving or parking violation, or that the instantaneous driving conditions are liable to result in damage to a motor vehicle or to a person, comprising:

a) A database in which are stored map data, traffic regulation data, and position data related to the location of substantially all traffic lights and road signs within a predetermined geographical area;

b) A receiver for a "global position system" (GPS), which includes, as referred to herein, a differential global position system (DGPS), said GPS being adapted to determine the instantaneous real-time location of a motor vehicle;

c) Means for determining the instantaneous color of a traffic light in the vicinity of said determined instantaneous real-time location of the motor vehicle and the rate at which the color of the traffic light changes;

d) Computing means carried by said vehicle suitable for receiving the instantaneous location of said motor vehicle from said GPS receiver, for determining the speed, orientation, and acceleration (hereinafter referred to as "state") of said vehicle, and for determining whether the driver has committed or is about to commit a driving or parking violation, and whether the instantaneous state is liable to result in damage to a motor vehicle or to a person, by comparing said state with said stored map data, traffic regulation data, and position data and with the instantaneous color and color changing rate of said traffic light according to predetermined rules;

e) A display on which is displayed the instantaneous location of said motor vehicle being superimposed on said stored map data; and f) Means for outputting an alert signal to the driver of said vehicle, such as an audible alert transmitted to a speaker or a visible alert displayed on said display, when said computing means determines that the driver has committed, or is about to commit, a driving or parking violation, or that the instantaneous state is liable to result in damage to a vehicle or to a person.

In one embodiment of the invention, the computing means includes one or more sensors, such as an accelerometer, gyroscope, velocity sensor, and speedometer of the driven vehicle, in communication with a computer.

In one embodiment of the invention, the instantaneous state is determined by determining the change in location of the vehicle.

In one embodiment of the invention, the means for determining the instantaneous color and color changing rate of a traffic light is a receiver adapted to receive signals transmitted from a corresponding traffic light.

In one embodiment of the invention, the instantaneous color and color changing rate of a traffic light are determined by means of a traffic light database of a transportation authority transmittable via a suitable data network, e.g. Worldwide Interoperability for Microwave Access (Wi-MAX) or General Packet Radio Services (GPRS), to an onboard computer.

The system preferably further comprises a reader in communication with the computing means, by which a driver profile is input prior to the commencement of a driving operation. Accordingly, the system "sensitivity," being indicative of the interval prior to the estimated driving violation time, at which an alert signal is generated, is adjustable, depending on the input driver profile. If the driver is inexperienced, the system sensitivity is longer than that of an experienced driver.

In one aspect, the display is the windshield of the vehicle on which an image generator transmits an image corresponding to the instantaneous location of a motor vehicle being superimposed on suitable map data.

In one embodiment of the invention, each alert signal is stored in permanent memory and is retrievable by an inspector at a future time.

In one embodiment of the invention, the system further comprises communication apparatus, such as a transceiver and modem, for transmitting an alert signal to an external authority, such as the parents of the driver or a ticket issuing department of a transportation authority. The alert signal may be a telephone call, a short message service (SMS) message, a wireless transmission, an e-mail message, or textual information transmitted via the Internet.

In one aspect, the database is further stored with topographical data of the roads located within the predetermined geographical area, an alert being outputted to the driver when the computing means determines, due to the instantaneous state of the vehicle with respect to local topographical data, a risk of impending damage to the vehicle.

In one aspect, the database is further stored with meteorological data of the predetermined geographical area, such as the rate of rainfall or wind speed, an alert being outputted to the driver when the computing means determines, due to the instantaneous state of the vehicle with respect to local meteorological data, a risk of impending damage to the vehicle.

In one embodiment of the invention, the database of the predetermined geographical area is transmittable, such as being downloadable, from a main database of a transportation authority.

The present invention is also directed to a data storage device comprising memory means in which retrievable map data, traffic regulation data, and position data related to the location of substantially all traffic lights and road signs within a predetermined geographical area are stored. The memory means is in data communication with computing means of a transportation authority monitoring center or of a driver alert system, said computing means adapted to compare a determined vehicular state with said stored map data, traffic regulation data, and position data.

In one embodiment, the data storage device is a local device having magnetic memory, solid state memory such as flash memory, read only memory (ROM) and random access memory (RAM), or optically stored memory such as a compact disc (CD) or a digital versatile disc (DVD).

In another embodiment, the data storage device is a remote server the computing means of which is also in data communication via a wireless data network with a GPS receiver and at least one motion sensor of each of a plurality of vehicles.

In another embodiment, the memory means is further stored with meteorological data in the vicinity of the predetermined geographical area and/or topographical data associated with roads located within the predetermined geographical area.

The present invention is also directed to a transportation authority monitoring system, comprising:

a) A database in which are stored map data, traffic regulation data, and position data related to the location of substantially all traffic lights and road signs within a predetermined geographical area;
b) Means for determining the instantaneous color of each traffic light within said predetermined geographical area and the rate at which the color of each of said traffic lights changes;
c) A transmitter mounted on each vehicle located within said predetermined geographical area, each transmitter being in communication with a GPS receiver and with at least one motion sensor mounted on a corresponding vehicle and adapted to transmit data sensed by said GPS receiver and by said at least one motion sensor which is associated with said corresponding vehicle;
d) A regional transceiver positioned within said predetermined geographical area for receiving the data transmitted by each of said transmitters and for transmitting said received data to a monitoring center transceiver;
e) Computing means in wireless data communication with said database and with said monitoring center receiver, for determining the state of each of a plurality of vehicles located within said predetermined geographical area, and for determining whether the driver of a corresponding vehicle has committed a driving or parking violation, and whether the instantaneous state of a corresponding vehicle is liable to result in damage to a vehicle or to a person, by comparing said state with said stored map data, traffic regulation data, and position data and with the instantaneous color and color changing rate of said traffic light according to predetermined rules;
f) A display of said predetermined geographical area on which is displayed the instantaneous state of each motor vehicle being superimposed on said stored map data; and
g) Means for outputting an alert signal, such as a visible alert displayed on said display, when said computing means determines that a driver has committed, or is about to commit, a driving or parking violation, or that the instantaneous state is liable to result in damage to a vehicle or to a person.

The monitoring center transceiver preferably transmits the alert signal to a local transportation representative, so that the driver of the vehicle for which the alert signal was transmitted will be issued a ticket or will be informed by said representative to drive in a more responsible fashion.

DETAILED DESCRIPTION OF PREFERRED EMBODIMENTS

The present invention is a driver alert system that alerts a driver of committed or impending driving violations or of impending damage to a motor vehicle or to a person based on the instantaneous state of a motor vehicle, including its real-time location, speed, acceleration and orientation. A computer carried by the vehicle determines whether an alert is to be generated by referring to stored traffic regulation data and position data related to the location of all traffic lights and road signs within a predetermined geographical area in the vicinity of the instantaneous location of the motor vehicle. By alerting the driver concerning committed or impending driving violations, or of impending damage to a vehicle or to a person, the vehicle state may be corrected, thereby avoiding life-endangering collisions or accidents.

Figure 1:
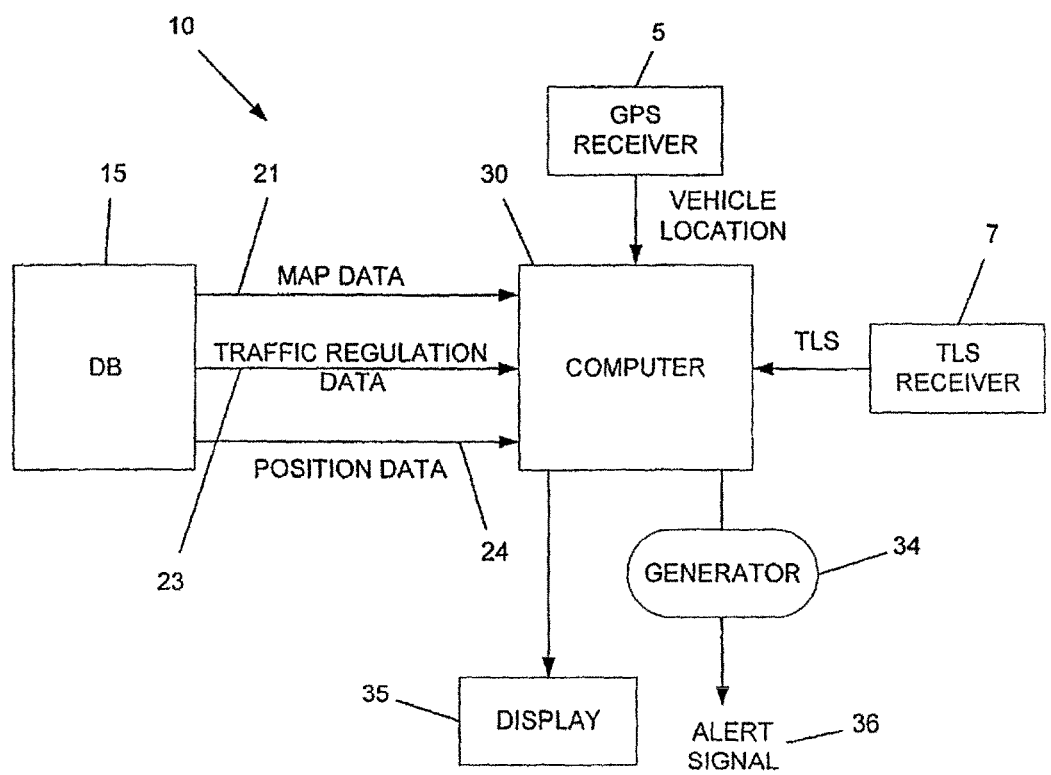
FIG. 1 is a block diagram of one embodiment of a driver alert system in accordance with the present invention.

FIG. 1 illustrates one embodiment of the driver alert system of the present invention, which is generally designated by numeral 10. Driver alert system 10 comprises receiver 5 for a global position system (GPS), which is adapted to determine the instantaneous real-time location of a motor vehicle, database 15 in which are stored map data 21, traffic regulation data 23, and position data 24 related to the location of all traffic lights and road signs within a predetermined geographical area, receiver 7 adapted to receive signals transmitted from a corresponding traffic light for indicating the instantaneous color of the corresponding traffic light and the rate at which the color of the traffic light changes, computer 30 carried by the vehicle, display 35 being visible to the driver on which is displayed the instantaneous location of the motor vehicle with respect to stored map data 21, and generator 34 for outputting an alert signal 36 to the driver of the vehicle when computer 30 determines that the driver has committed, or is about to commit, a driving violation. An alert may be an audible alert transmitted to a speaker or a visible alert displayed on display 35. Display 35 may be a separate monitor or may be the windshield of the vehicle on which generator 34 transmits an image corresponding to the instantaneous location of a motor vehicle being superimposed on suitable map data.

Computer 30 is in data communication with GPS receiver 5. After receiving the instantaneous location of the motor vehicle from GPS receiver 5 several times per second, depending on the sampling rate, computer 30 determines the speed, orientation, and acceleration of the vehicle based on its change in location. Computer 30 receives map data 21, traffic regulation data 23, and position data 24 from database 15 and traffic light signals (TLS) from receiver 7. Based on the received data, computer 30 is able to determine, by means of predetermined rules and control criteria well known to those skilled in the art, whether the driver has committed or is about to commit a driving violation.

As schematically illustrated in FIGS. 7A-D, the corresponding databases 15A-D may be embodied by a local data storage device such as a diskette 70A having magnetic memory, a local data storage device 70B having optically stored memory 15B such as a compact disc (CD) or a digital versatile disc (DVD), a local data storage device 70C having solid state memory such as flash memory, read only memory (ROM) and random access memory (RAM), or a remote server 70D provided with database 15D which is in data communication via wireless data network 75 with computer 30 of the corresponding vehicle.

FIGS. 2-5 illustrate several road scenarios visible on display 35 for which an alert signal is generated. The following examples illustrate the utility of the present invention, and it will be appreciated that many other examples are also possible.

Figure 2:
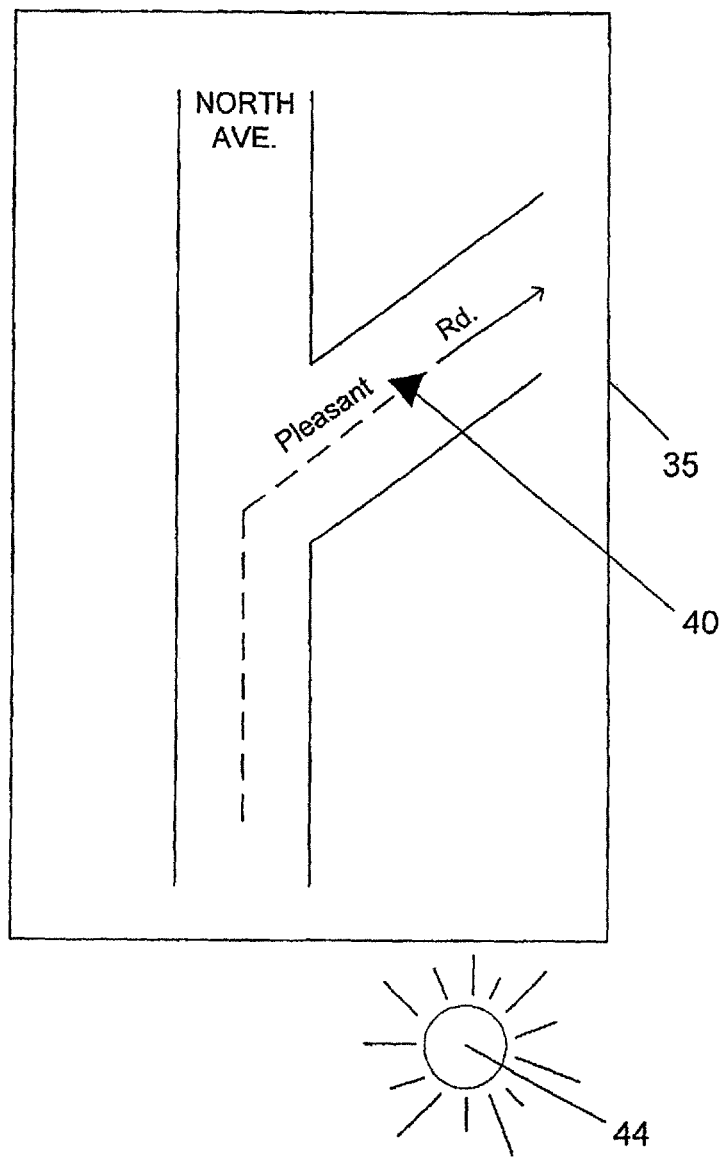
FIG. 2 schematically illustrates the generation of an audible alarm when the local speed limit is exceeded.

As shown in FIG. 2, vehicle 40 has turned from North Ave. to Pleasant Rd and has decelerated to a speed of 60 km/h. The computer has determined that vehicle 40 is continuing at a constant speed of 60 km/h and therefore is exceeding the local speed limit of 50 km/h. An audible alarm signal is enunciated from speaker 44. The alarm signal may be an electronic signal, or may be a pre-recorded voice message.

Figure 3:
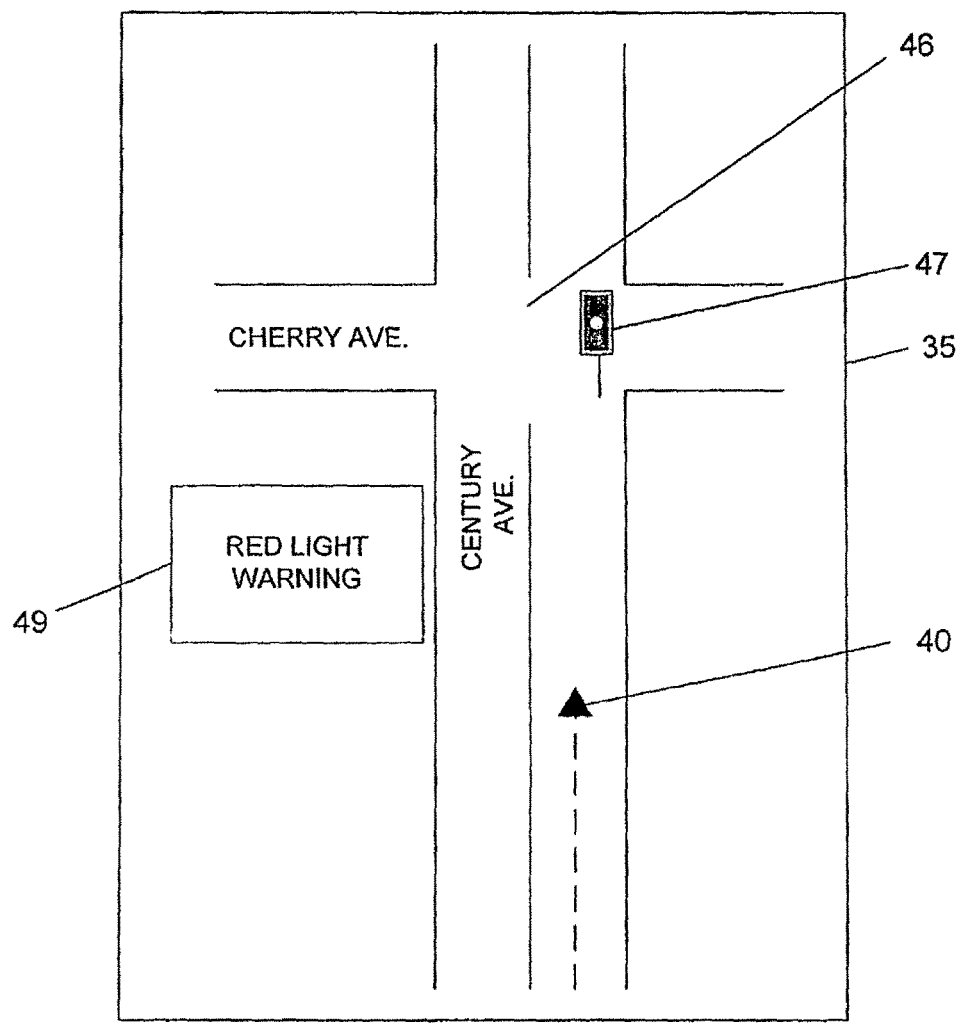
FIG. 3 schematically illustrates the generation of a visible alert signal when the instantaneous speed of a vehicle is such that it will not successfully pass an intersection before the color of a traffic light turns to red.

As shown in FIG. 3, vehicle 40 is traveling along Century Ave, towards intersection 46 of Cherry Ave. and Century Ave. The computer has determined that vehicle 40 is accelerating, in order to pass intersection 46 before the color of traffic light 47 turns to red. Based on the received TLS, which is transmitted at a distance of approximately 200 m from vehicle 40 and indicates that traffic light 47 will turn to red within 4 seconds, the computer determines that vehicle 40 will not successfully pass intersection 46 without braking. An alarm signal is therefore generated, causing visible alert 49, such as a flashing "Red Light Warning" alert, to be displayed on one region of display 35.

Figure 4:
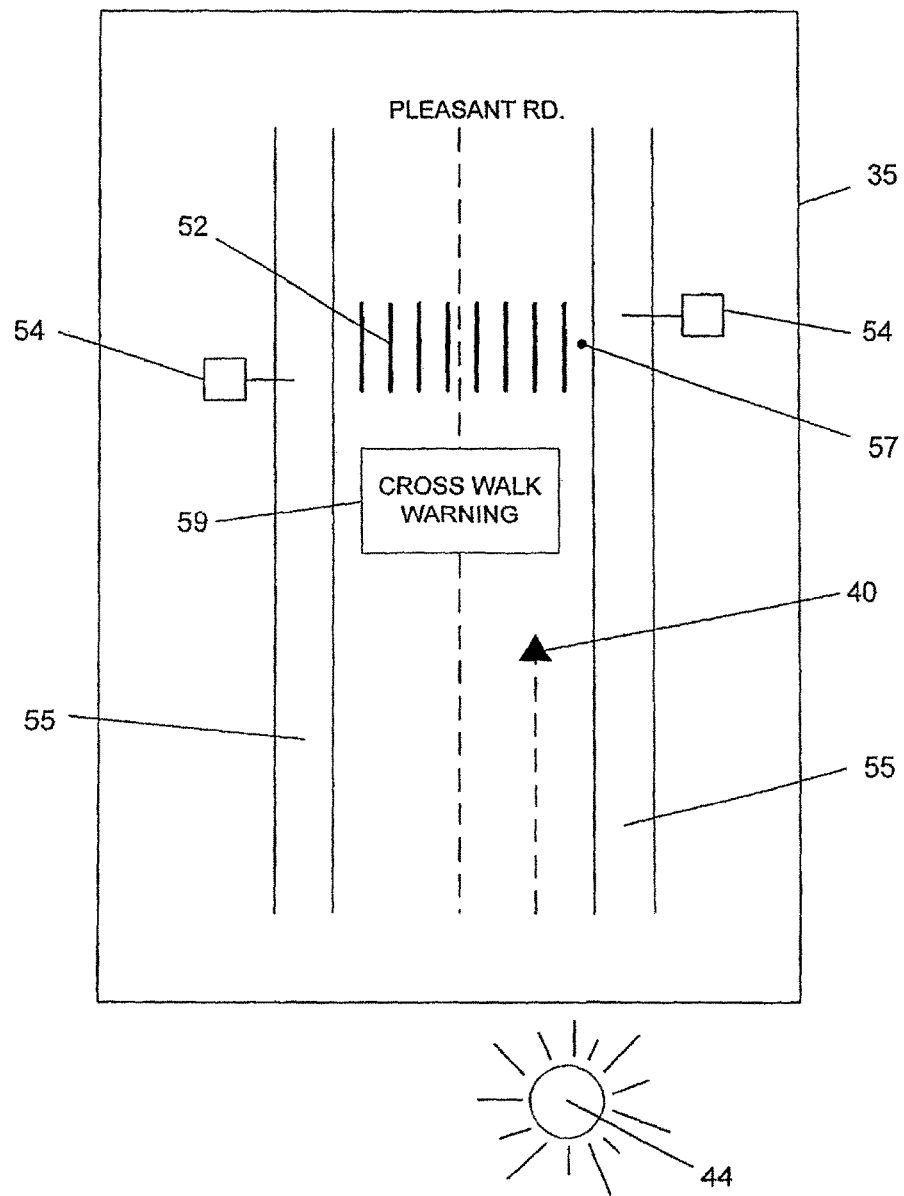
FIG. 4 schematically illustrates the generation of an alert signal when a vehicle approaches a crosswalk along which a pedestrian is walking.

In FIG. 4, vehicle 40 is traveling on Pleasant Rd., towards crosswalk 52. Two crosswalk lights 54 disposed on opposite sides of crosswalk 52 and vertically protruding from a corresponding sidewalk 55 display to pedestrians when Pleasant Rd. may be crossed and further transmit a TLS signal to vehicles in the vicinity thereof. Each crosswalk light 54 has an optical eye that detects when a pedestrian crosses its path by stepping on crosswalk 52. As shown, pedestrian 57 has stepped on crosswalk 52. Crosswalk light 54 transmits a suitable TTL signal to vehicle 40 which is indicative of the presence of pedestrian 57 on crosswalk 52. An alert signal is immediately generated, causing both visible alert 59, such as a "Crosswalk Warning" alert, and audible alert 44 to be generated, to warn the driver that the speed of vehicle 40 is excessive in the vicinity of crosswalk 52.

Figure 5:
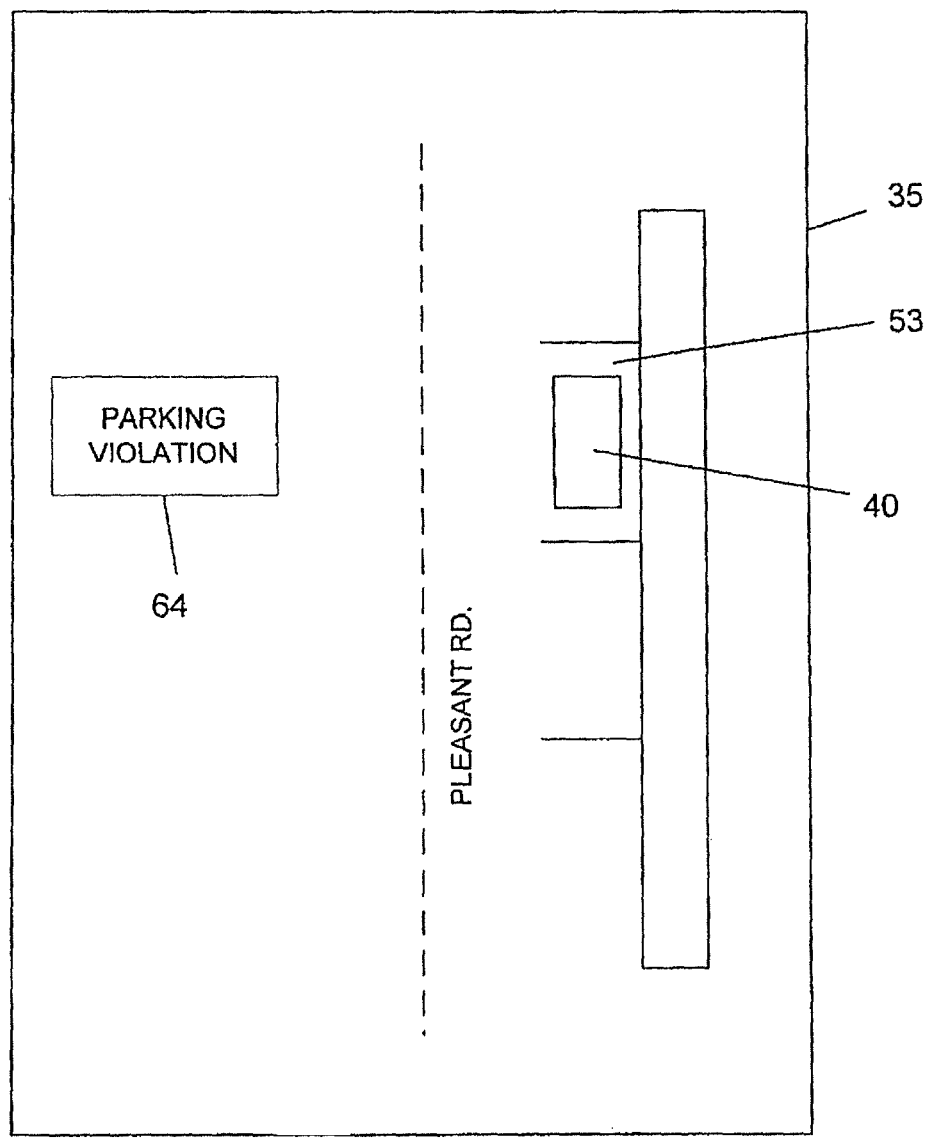
FIG. 5 schematically illustrates the generation of an alert signal when a parking violation is detected.

In FIG. 5, the computer has determined that vehicle 40 has parked in parking space 53. The position data stored in the database is indicative that parking space 53 is reserved for invalids. An alarm signal is therefore generated, causing visible alert 64, such as a "Parking Violation" alert, to be displayed on one region of display 35.

It will be appreciated that the driver alert system may be configured such that a "Parking Violation" alarm signal will be generated prior to the parking of the vehicle. For example, the alarm signal will be generated if the vehicle is approaching an illegal parking space, such as one reserved for invalids or dignitaries, at a predetermined speed range, e.g. 5-10 km/h. The alarm signal generation is preferably selective so as to be triggered only when the computer determines that the vehicle state is indicative that the vehicle is commencing a parking operation, i.e. the vehicle is at a predetermined maximum distance from the parking space and is advancing at a speed and orientation suitable for parking at the given parking space.

An alarm signal will be similarly generated for any other driving or parking violation, such as driving through a stop sign without stopping or driving through a "No Entrance" sign.

A selectively triggered alarm signal is also suitable for many different driving violations. For example, an alarm signal will be triggered if the speed of the vehicle adjacent to a stop sign is greater than 0 km/h, or is greater than a predetermined speed at a given distance from the stop sign indicative that the vehicle is unable to brake in time to be stationary at the vicinity of the stop sign. Another exemplary selectively triggered alarm signal is a "No U-Turn" warning which will be generated if the speed of a vehicle is lowered only when driving in the left lane, but not in the right lane, of a road in the vicinity of the corresponding road sign.

Figure 6:
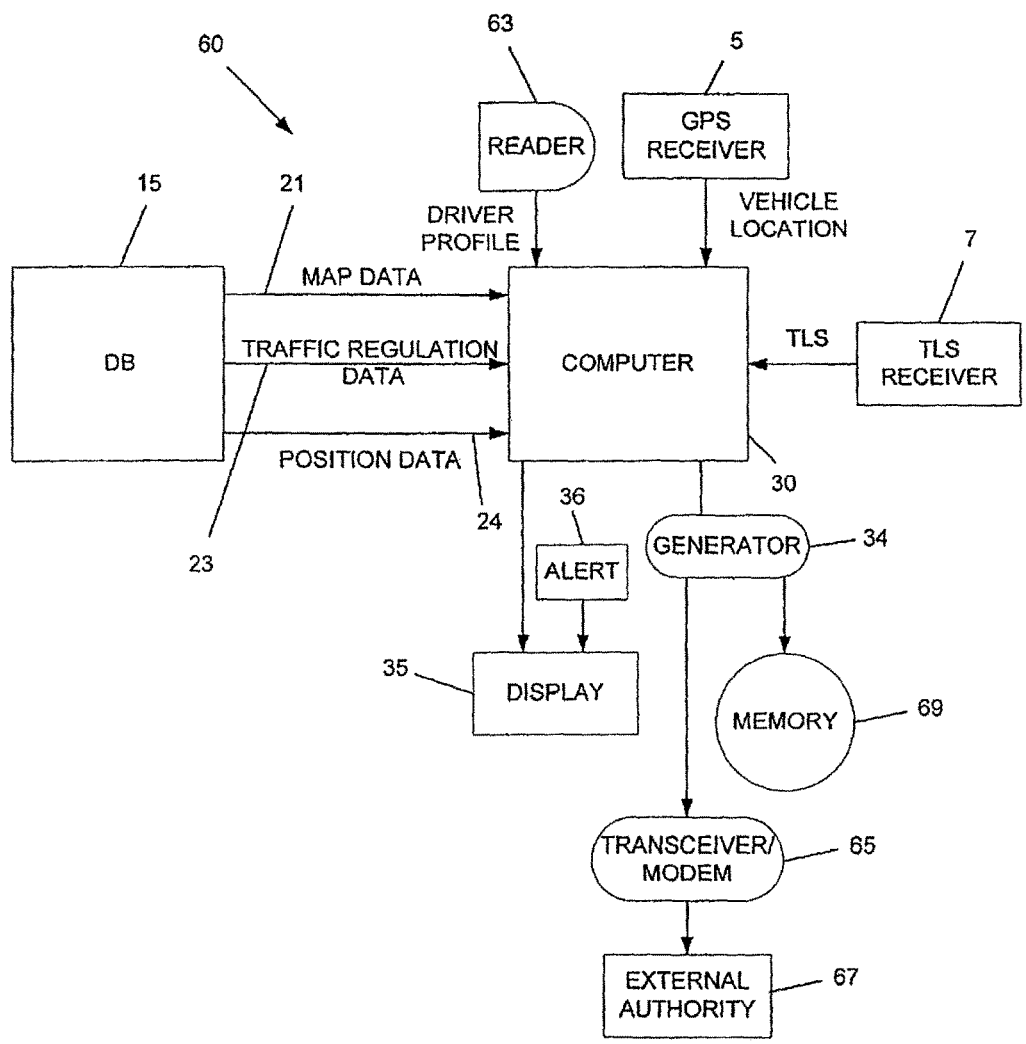
FIG. 6 schematically illustrates another embodiment of a driver alert system in which a driver profile is input before a vehicle is driven.
Figure 7A:
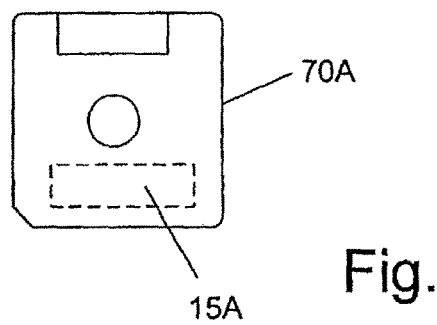
FIGS. 7A-D schematically illustrate various data storage devices in accordance with the present invention.
Figure 7B:
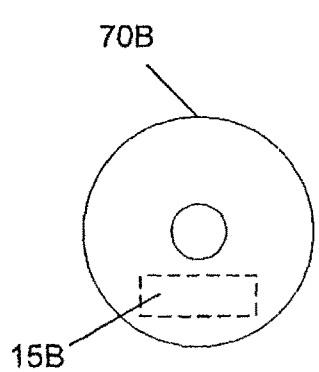
Figure 7C:
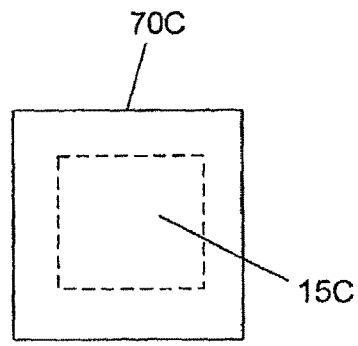
Figure 7D:
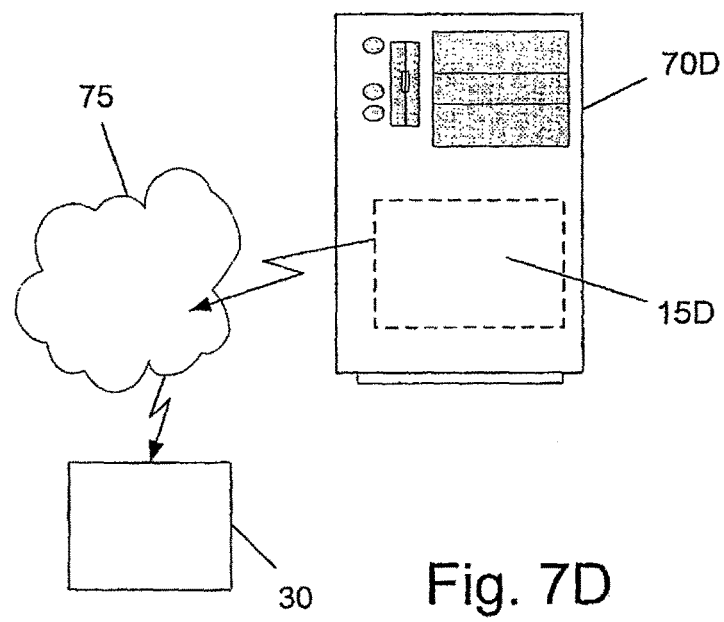

FIG. 6 illustrates another embodiment of the invention, wherein driver alert system 60 comprises, in addition to the components of driver alert system 10 illustrated in FIG. 1, reader 63 in communication with computer 30, by which a driver profile is input before the vehicle is driven. Reader 63 may be any suitable reader well known to those skilled in the art, such as a magnetic card reader or a logic chip for determining a code input by means of a keypad.

Driver alert system 60 advantageously adjusts the sensitivity, i.e. the interval prior to the estimated driving violation time, of alert signal generation in response to the input driver profile. A driver profile may include age, gender, and years of driving experience. A list of driver profiles of drivers that are authorized to drive the vehicle is stored within computer 30. If the driver is inexperienced, the system sensitivity is longer than that of an experienced driver. Similarly if the driver is elderly, the system sensitivity is longer than for a younger driver due to the relatively long reaction time.

Driver alert system 60 is also suitable for informing an external authority 67 concerning the generation of an alarm signal or that irresponsible driving conditions are being exhibited by the present driver that are liable to result in damage to a vehicle or to a person. An externally transmittable alert signal is particularly useful for vehicles that are driven by many drivers, such as rented cars or army vehicles. After an alert signal 36 is generated by generator 34, it is transmitted by communications equipment 65, such as a transceiver or modem, to external authority 67. External authority 67 may be a parent of the driver, a ticket issuing department of a transportation authority, or a transportation authority monitoring system. The alert signal may be a telephone call, a short message service (SMS) message, a wireless transmission, an e-mail message, or textual information transmitted via the Internet. Each alert signal may be stored in permanent memory 69, e.g. in the memory of a memory device carried by the vehicle or of a remote server, so as to be retrievable by an inspector at a future time.

It will be appreciated that in order to generate an alert signal in this embodiment, the driver alert system may be provided without a display. Accordingly, the alert signal will be transmitted to the external authority without knowledge of the driver.

Figure 8:
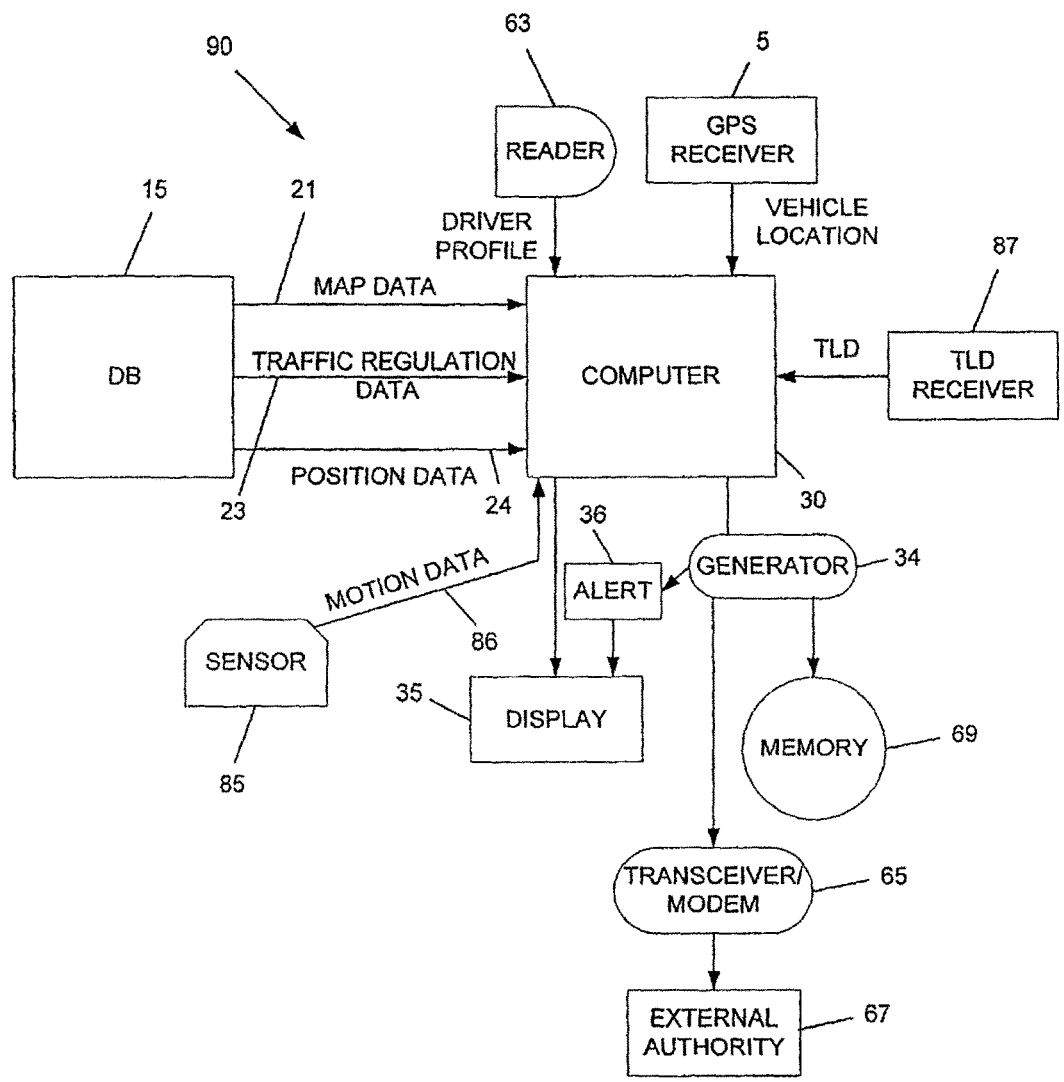
FIG. 8 schematically illustrates another embodiment of a driver alert system in which a vehicular state is determined by means of at least one motion sensor.

FIG. 8 illustrates another embodiment of the invention, wherein driver alert system 90 comprises, in addition to the components of driver alert system 10 illustrated in FIG. 1, one or more motion sensors 85 mounted on a vehicle, such as an accelerometer, gyroscope, velocity sensor, and speedometer of the driven vehicle, in communication with computer 30. Computer 30 is able to determine the instantaneous state of a vehicle by correlating the instantaneous location thereof, as received by GPS receiver 5, with motion data 86 detected by each of the sensors 86. In this embodiment, the instantaneous color and color changing rate of traffic lights in the vicinity of the instantaneous location of the vehicle are received by receiver 87 in communication with a traffic light database (TLD) of a transportation authority. The traffic light data is transmitted to TLD receiver 87 via a suitable data network, e.g. Worldwide Interoperability for Microwave Access (WIMAX) or General Packet Radio Services (GPRS), and is then received by computer 30. Computer 30 is then able to determine whether the driver of a corresponding vehicle has committed a driving or parking violation, and whether the instantaneous state of the vehicle is liable to result in damage to a vehicle such as an adjacent vehicle or to a person such as a pedestrian or a bystander, by comparing the instantaneous vehicular state with the stored map data 21, traffic regulation data 23, and position data 24, with the received motion data 86, and with the traffic light data TLD according to predetermined rules.

Figure 9:
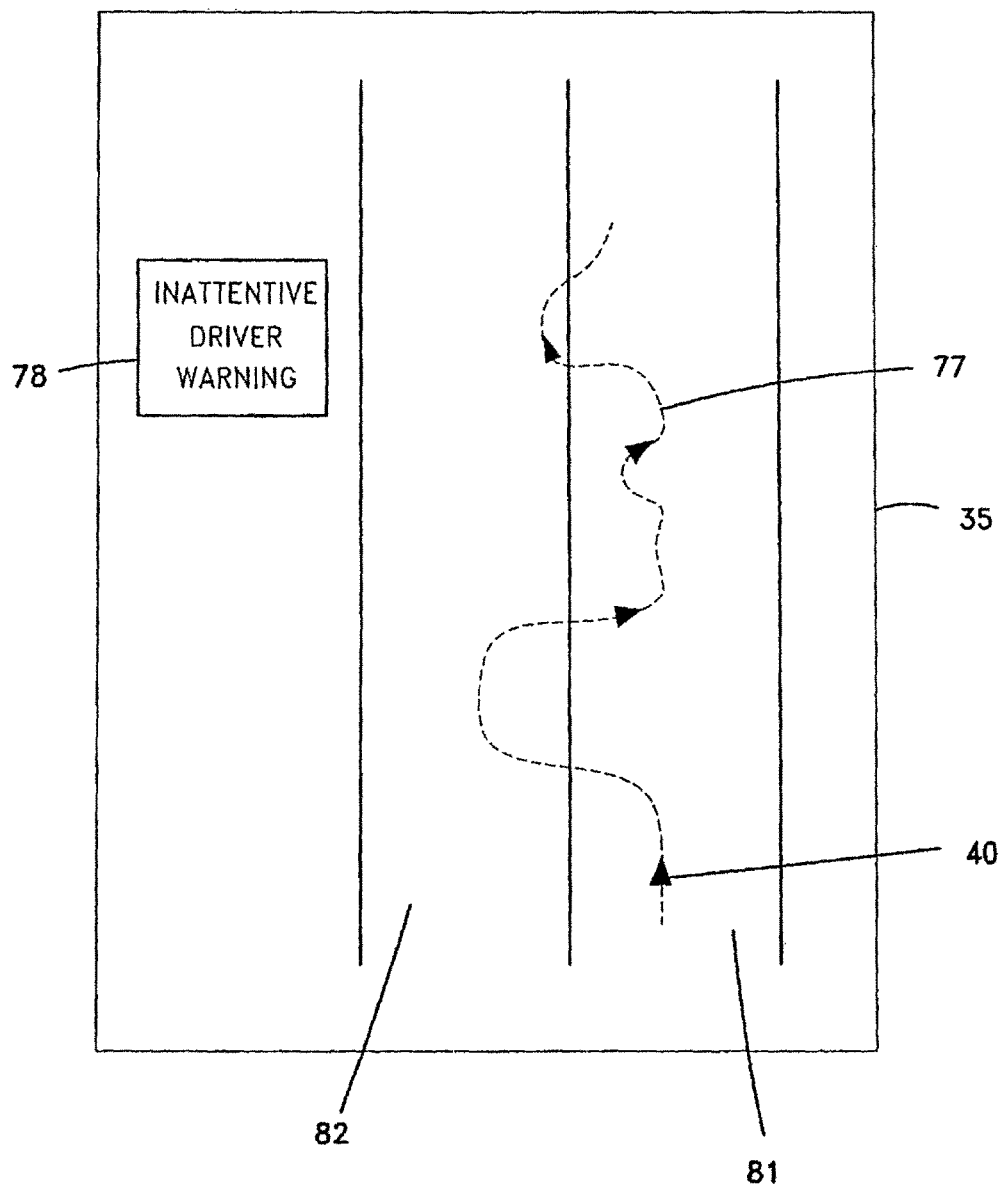
FIGS. 9-11 schematically illustrate several examples for which an alert signal is generated when irresponsible driving conditions are being exhibited by a driver.
Figure 10:
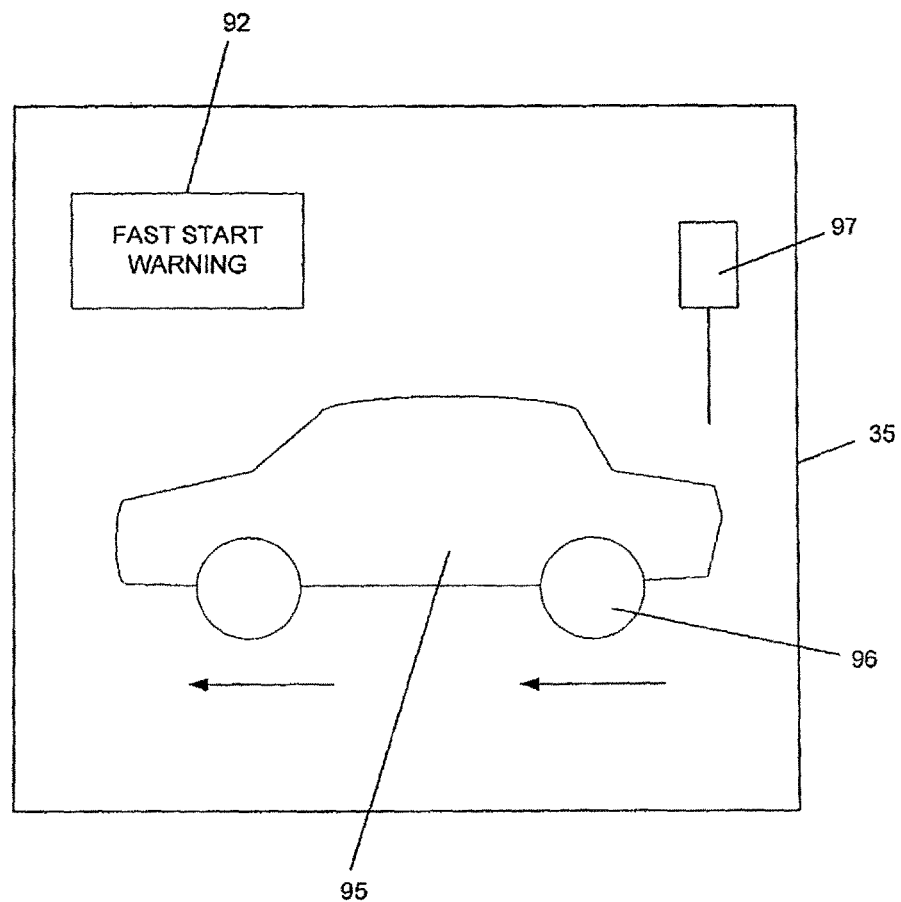
Figure 11:
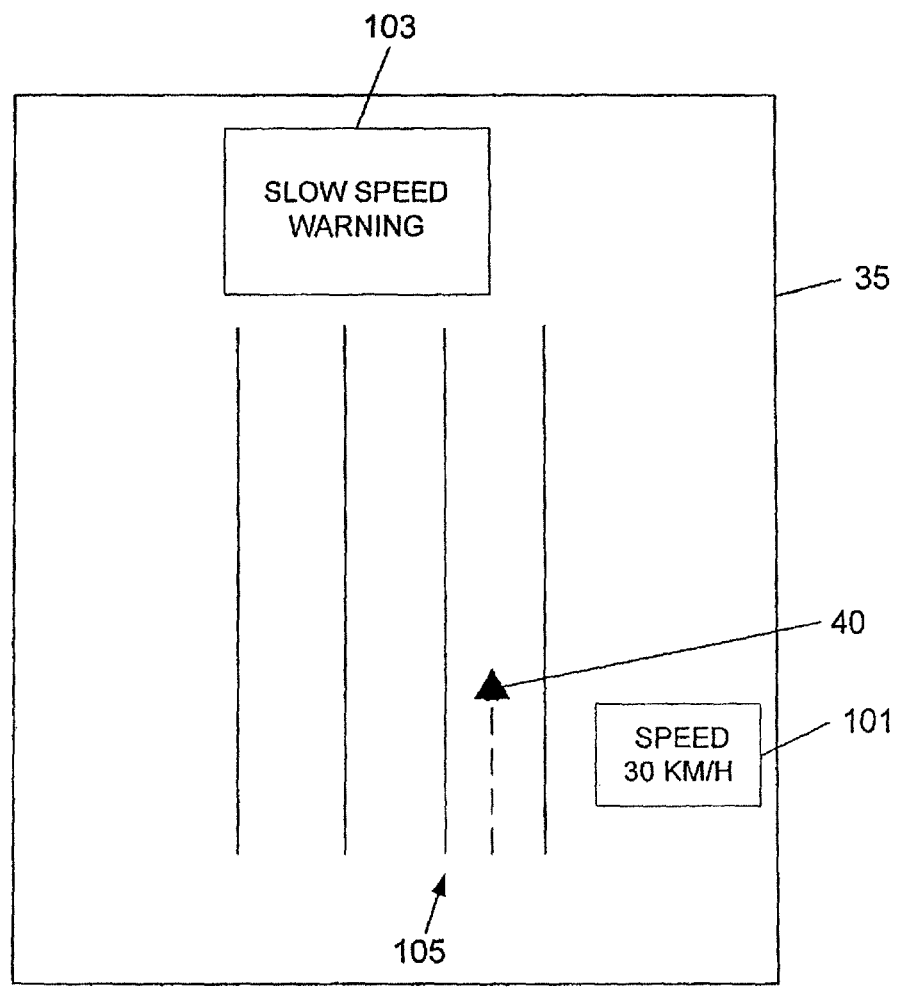

FIGS. 9-11 illustrate several road scenarios visible on display 35 for which an alert signal is transmitted when irresponsible driving conditions are being exhibited by the present driver.

In FIG. 9, a trace 77 of the path of vehicle 40 when being driven along Century Ave. is generated on display 35. Vehicle 40 is shown as first being driven straight along lane 81 and then randomly swerving back and forth into lane 82, without any set pattern. The computer determines that the driver of vehicle is suffering from drowsiness, and an alarm signal 78, such as the "Inattentive Driver Warning," is displayed.

In FIG. 10, an alarm signal 92, such as a "Fast Star Warning," is shown on display 35 when the driver of vehicle 95 advances from a stationary position, e.g. after traffic light 97 changes its color from a red light to a green light, by an excessively fast start in response to the depressing of the gas pedal to such a degree that wheels 96 of vehicle 95 slide and do not roll. The computer determines that wheels 96 are sliding when the detected velocity of vehicle 95 sensed by a rotation sensor mounted to a wheel is less than the actual vehicle velocity sensed by the vehicular speedometer. When the same driver, the profile of whom is input to the computer via reader 63 (FIG. 8), is found to undergo many fast starts which are potentially destructive to the engine of the vehicle, the alarm signal is also transmitted to external authority 67.

Similarly, an "Emergency Braking Warning" is displayed when the computer determines that wheels 96 are sliding prior to a full stop in response to an excessive depressing of the brakes. The computer determines that wheels 96 are sliding when the detected velocity of vehicle 95 sensed by a rotation sensor mounted to a wheel is less than the actual vehicle velocity sensed by the vehicular speedometer.

Irresponsible driving conditions are also detected when the speed of a vehicle is excessively slow. As shown in FIG. 11, when the speed of vehicle 40 is excessively slow, e.g. 30 km/h, as indicated on region 101 of display 35, when driving on three-lane highway 105 having a minimum speed requirement of e.g. 70 km/h, an alarm signal 103, such as a "Slow Speed Warning," is displayed. Such a slow speed increases traffic congestion and is liable to result in a collision by drivers that are desirous of driving at a considerably faster speed. An estimated minimum speed requirement is generally not provided by a traffic authority, and needs to be manually input to the database by representatives of the driver alert system provider.

Figure 12:
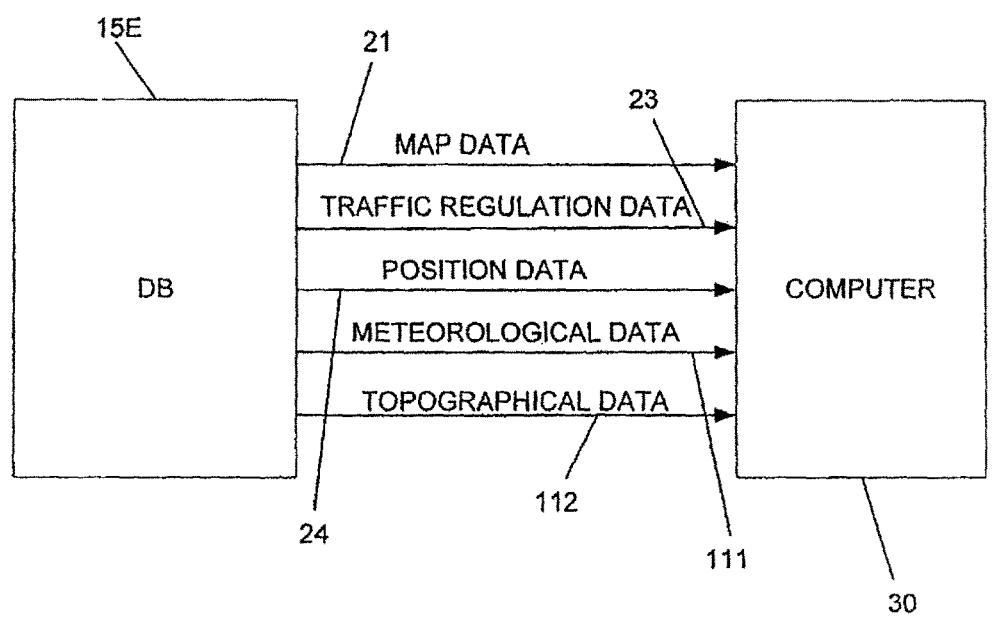
FIG. 12 schematically illustrates another embodiment of a database in accordance with the present invention.

In another embodiment of the invention illustrated in FIG. 12, database 15E in data communication with computer 30 is stored with meteorological data 111 and topographical data 112, in addition to map data 21, traffic regulation data 23, and position data 24. Database 15E is compatible with any of the aforementioned driver alert systems. It will be appreciated that database 15E may be provided with either meteorological data 111 or topographical data 112. Meteorological data 111 and topographical data 112 may be manually input to the database by representatives of the driver alert system provider.

Figure 13:
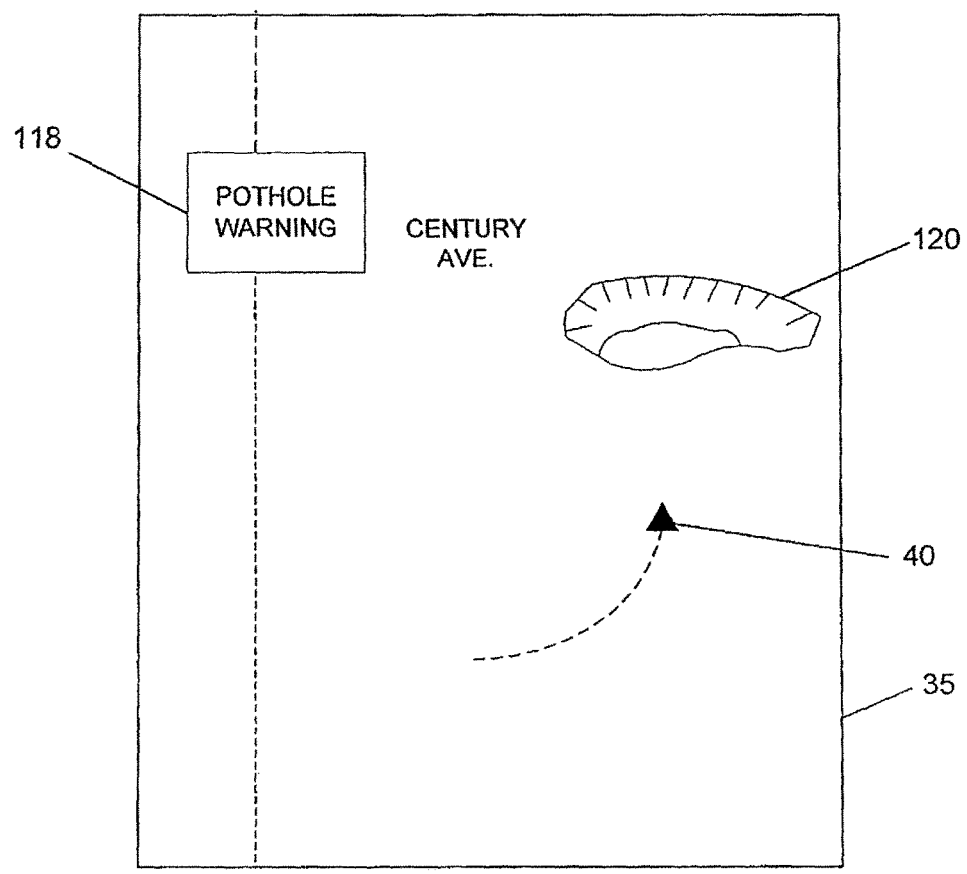
FIG. 13 schematically illustrates the generation of an alert signal in response to topographical data.

FIG. 13 illustrates an alarm signal 118 visible on display 35, such as a "Pothole Warning," when the state of vehicle 40 is such that the vehicle may be damaged upon entry of its wheels into pothole 120.

Figure 14:
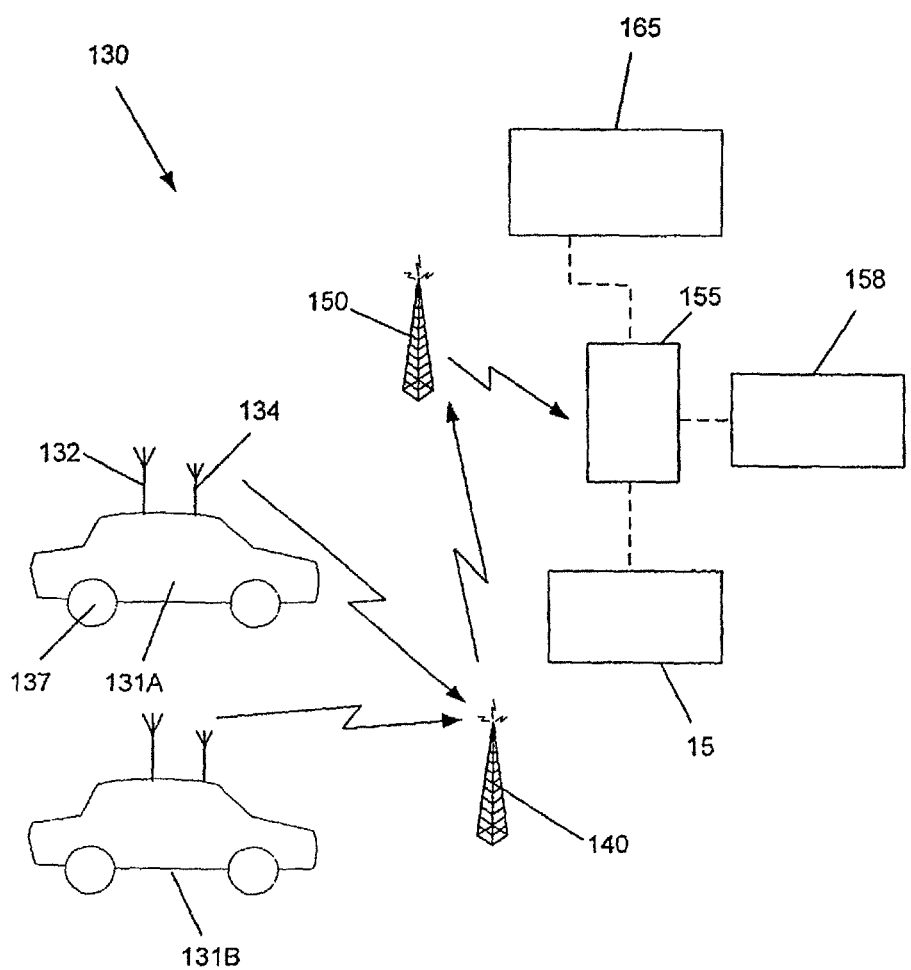
FIG. 14 illustrates a transportation authority monitoring system in accordance with the present invention.

FIG. 14 illustrates another embodiment of the invention wherein the data storage device, in which are stored map data, traffic regulation data, position data, and optionally, meteorological data and/or topographical data associated with a predetermined geographical area, is in communication with a transportation authority monitoring system. With such a monitoring system, representatives of the transportation authority can monitor the state of all vehicles in a predetermined geographical area and can determine whether the driver of a vehicle has committed a driving or parking violation, and whether the instantaneous state of a vehicle is liable to result in damage to an adjacent vehicle or to a person.

As shown, transportation authority monitoring system 130 comprises a transmitter 132 mounted on each vehicle, including the illustrated vehicles 131A and 131B, located within a predetermined geographical area, a regional transceiver 140 positioned within the predetermined geographical area and adapted to receive the data transmitted from each corresponding transmitter 132 and to retransmit the received data to monitoring center transceiver 150, and computing means 155, e.g. a server, in wireless data communication with monitoring center receiver 150, with database 15, with TLD 158, and with display 165. Each transmitter 132 is in communication with a corresponding GPS receiver 134 and with at least one motion sensor 137 mounted on the corresponding vehicle. The signal transmitted by transmitter 132 to regional transceiver 140 preferably includes identification information associated with the corresponding vehicle.

Figure 15:
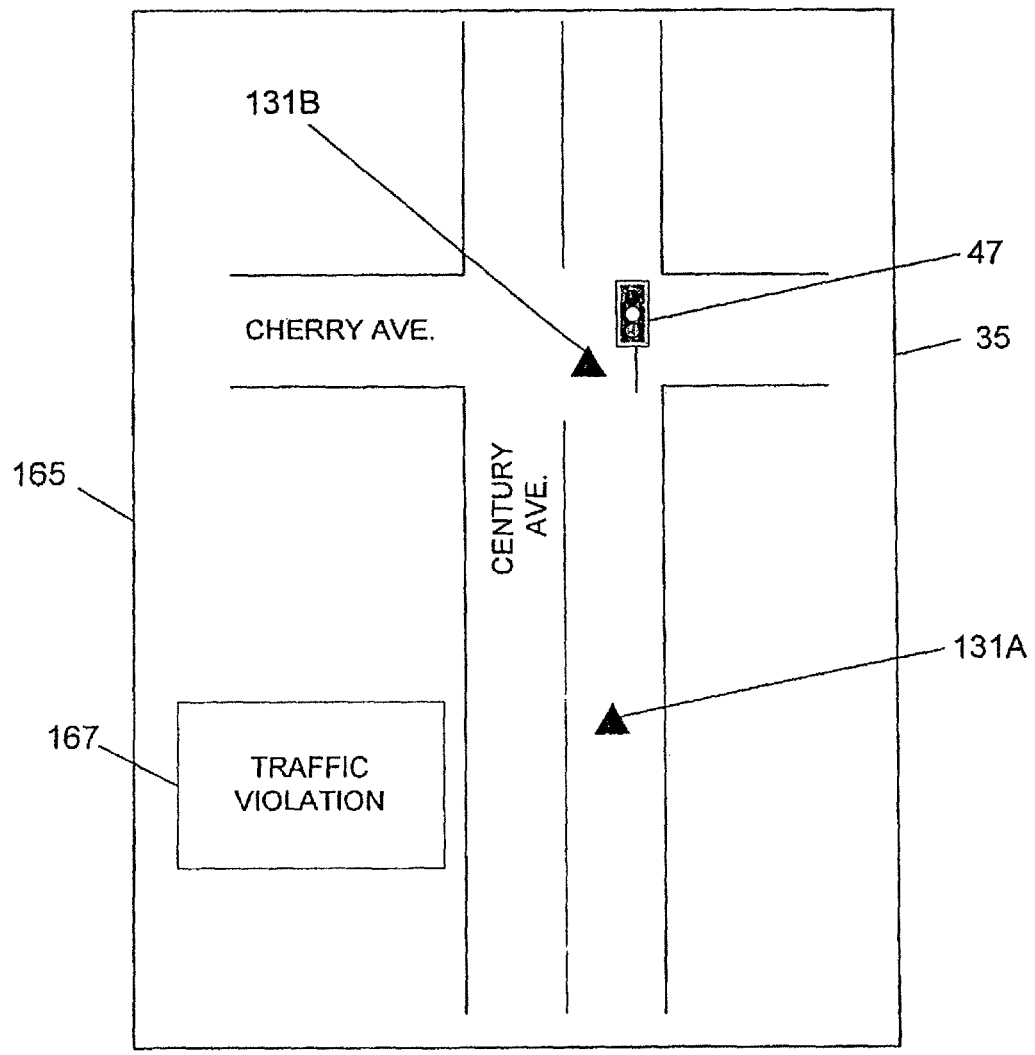
FIG. 15 schematically illustrates a display that is visible and able to be monitored with the system of FIG. 14.

As shown in FIG. 15, monitor 165 of the transportation authority monitoring system displays the state of a plurality of vehicles located within a given geographical area, e.g. the illustrated vehicles 131A and 131B. In the illustrated example, vehicle 131A is shown as stopping at the red light of traffic light 47 located at the intersection of Cherry Ave and Century Ave., while vehicle 131B is shown as ignoring the traffic regulation and passing through the intersection while the red light is visible. An alarm signal 167, such as a visible "Traffic Violation" display, is generated. A representative viewing display 165 may inform a policeman in the vicinity of traffic light 47 of the traffic violation. Alternatively, the alarm signal is automatically transmitted from the monitoring center transceiver to the policeman in the vicinity of traffic light 47.

Figure 16:
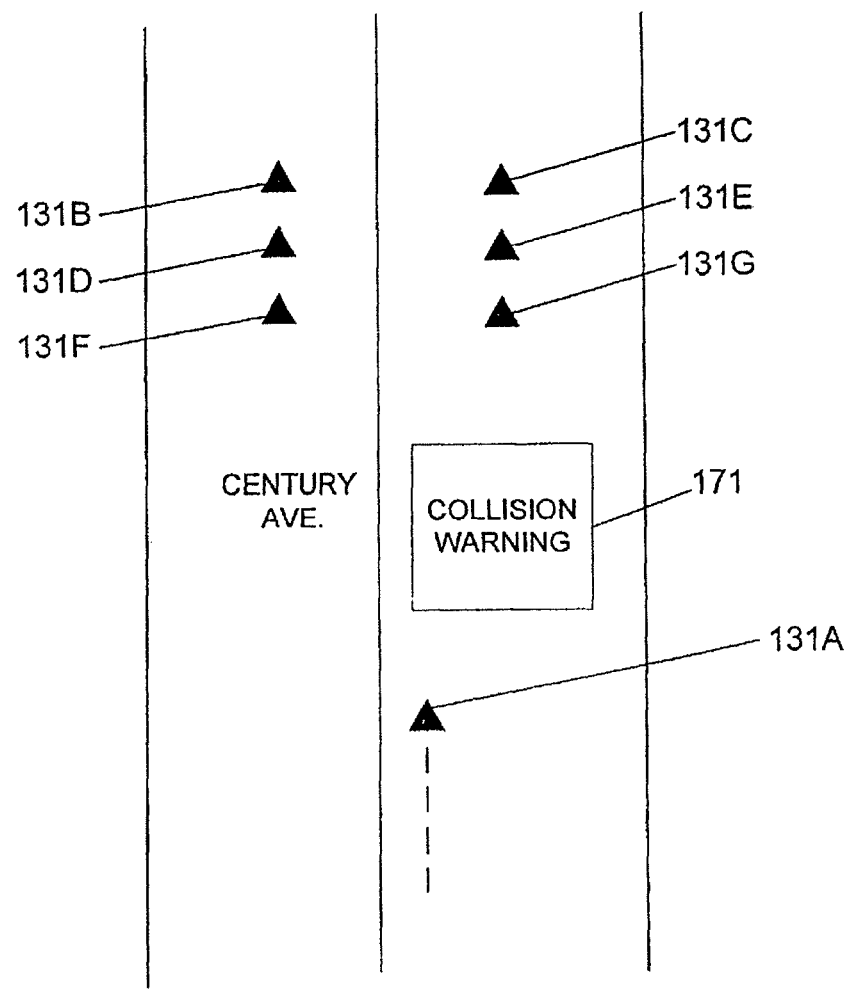
FIG. 16 schematically illustrates an exemplary alert signal that is generated when a driver alert system is in communication with a transportation authority monitoring system.

The transportation authority monitoring system can advantageously communicate with a driver alert system mounted on each corresponding vehicle. As shown in FIG. 16, vehicle 131A is traveling along Century Ave. and is unaware that vehicles 131B-G are involved in a traffic jam on the same road. The driver alert system receives data from the transportation authority monitoring system indicating that vehicles 131B-G are involved in the traffic jam. Accordingly, an alarm signal 171, such as a visible "Collision Warning," is displayed when the state of vehicle 131A is such that vehicle 131A may collide with one of the vehicles involved in the traffic jam. To prevent a collision, the vehicle may be provided with collision preventing equipment, such as forced braking means which is activated upon generation of an alarm signal related to an impending collision.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A dynamic driver alert system for alerting a driver when a vehicle controlled by the driver is about to pass an intersection that has a traffic light that is about to turn red, the driver alert system consisting of:
   a) a receiver for a global position system (GPS), said GPS system being adapted to determine an instantaneous real-time location of a motor vehicle;
   b) a remote server comprising:
      a database configured to store map data, traffic regulation data, topographical data, meteorological data and position data related to the location of traffic lights, roads and road signs within a predetermined geographical area;
      a processing device configured to determine an instantaneous color of one of the traffic lights in a vicinity of the instantaneous real-time location of the motor vehicle and a rate at which the color of one of the traffic light changes,
      the processing device further configured to compare said instantaneous state of said vehicle with said stored map data, traffic regulation data, topographical data, meteorological data, position data, traffic conditions received from the database and the instantaneous color and color changing rate of a traffic light associated with said received location data to determine whether said instantaneous real-time location of said motor vehicle and its immediately following location will result in passing an intersection that has a traffic light that is about to turn red, such that if the processing device determines if the vehicle is about to pass an intersection that has a traffic light that is about to turn red, the processing device generates an alert signal;
      a transceiver configured to receive the instantaneous real-time location from the GPS receiver for each of a plurality of motor vehicles to transmit an alert signal to the plurality of motor vehicles; and the processing device is configured to receive said location data of the motor vehicles from said transceiver;

c) a transceiver carried by said vehicle and in communication with said GPS receiver, for transmitting said location data to said server and for receiving said alert signal generated by said processing device; and d) an alert generator carried by said vehicle in communication with said vehicle transceiver, for outputting an alert to the driver of said vehicle in response to receiving said alert signal, wherein the alert generator warns the driver of said vehicle when said vehicle will not be able to pass an intersection that has a traffic light that is about to turn red based upon said stored map data, traffic regulation data, topographical data, meteorological data, position data, traffic conditions received from the database and the instantaneous color and color changing rate of a traffic light associated with said received location data.

2. The system of claim 1, further comprising vehicle carried computer and display, said computer in communication with said GPS receiver and said display in communication with said computer, wherein the server is adapted to transmit map data associated with the location data of the vehicle to said computer and said display is adapted to display the instantaneous location of the motor vehicle being superimposed on said map data.

3. The system of claim 2, wherein the computer further comprises one or more sensors in communication therewith, data acquired by said one or more sensors being transmitted to the processing device of the server for assisting in determining an instantaneous state of the vehicle.

4. The system of claim 3, wherein the sensors are selected from the group of accelerometer, gyroscope, velocity sensor, and speedometer of the driven vehicle.

5. The system of claim 1, wherein the instantaneous state is determined by determining the change in location of the vehicle.

6. The system of claim 1, wherein the processing device configured to determine the instantaneous color and color changing rate of a traffic light comprises a traffic light database of a transportation authority transmittable via a suitable data network to the remote server.

7. The system of claim 1, further comprising a computer configured to input a driver profile prior to the commencement of a driving operation.

8. The system of claim 7, wherein a sensitivity of the alert signal is adjustable, based on the input driver profile.

9. The system of claim 2, wherein the display is the windshield of the vehicle on which an image generator transmits an image corresponding to the instantaneous location of a motor vehicle being superimposed on suitable map data.

10. The system of claim 1, wherein each alert signal is stored in permanent memory and is retrievable by an inspector at a future time.

11. The system according to claim 1, further comprising communication apparatus for transmitting an alert signal to an external authority.

12. The system of claim 11, wherein the alert signal transmitted to an external authority is selected from the group of a telephone call, a short message service (SMS) message, a wireless transmission, an e-mail message, or textual information transmitted via the Internet.

13. The system of claim 1, wherein the database is further stored with topographical data of the roads located within the predetermined geographical area, an alert being outputted to the driver when the computer determines, due to the instantaneous state of the vehicle with respect to local topographical data, a risk of impending damage to the vehicle.

14. The system of claim 1, wherein the database is further stored with meteorological data of the predetermined geographical area, an alert being outputted to the driver when the computer determines, due to the instantaneous state of the vehicle with respect to local meteorological data, a risk of impending damage to the vehicle.

15. The system of claim 1, wherein the database of the predetermined geographical area is transmittable from a main database of a transportation authority.

16. The system of claim 15, wherein the database is downloadable from the main database of a transportation authority.

17. The system of claim 7, wherein the driver profile includes at least one of driver age, gender and years of driving experience.

18. The system of claim 17, wherein if the driver is inexperienced, a sensitivity of the alert signal is longer than that of an experienced driver.

19. A transportation authority monitoring system consisting of:

a) a transmitter mounted on each vehicle located within a predetermined geographical area, each transmitter being in communication with a GPS receiver and adapted to transmit data sensed by said GPS receiver;

b) a regional transceiver positioned within said predetermined geographical area for receiving the data transmitted by each of said transmitters and for transmitting said received data to a monitoring center transceiver;

c) a server comprising;

a database in which are stored map data, traffic regulation data, and position data related to the location of substantially all traffic lights and road signs within said predetermined geographical area;

a processing device configured to determine an instantaneous color of a traffic light in a vicinity of said determined instantaneous real-time location of the motor vehicle and a rate at which the color of the traffic light changes;

a transceiver configured to receive the instantaneous real-time location of each of a plurality of motor vehicles from said regional transceiver; and a processing device suitable for receiving said location data of a motor vehicle from said transceiver, for determining an instantaneous state of said vehicle, for receiving current traffic conditions from the database, for determining whether the driver of said corresponding vehicle is about to pass an intersection that has a traffic light that is about to turn red by comparing said state with said stored map data, traffic regulation data, position data, the traffic conditions received from the database and with the instantaneous color and color changing rate of a traffic light associated with said received location data, according to predetermined rules, and for generating an alert signal, when said processing device determines if the vehicle is about to pass an intersection that has a traffic light that is about to turn red;

d) a display of said predetermined geographical area on which is displayed the instantaneous state of each motor vehicle being superimposed on said stored map data; and
e) an alert configured to output an alert signal to the driver of the vehicle, when said processing device determines if the vehicle is about to pass an intersection that has a traffic light that is about to turn red based upon said stored map data, traffic regulation data, position data, traffic conditions received from the database and the instantaneous color and color changing rate of a traffic light associated with said received location data.

20. The system of claim 19, wherein the monitoring center transceiver transmits the alert signal to a local transportation representative, so that the driver of the vehicle for which the alert signal was transmitted will be issued a ticket or will be informed by said representative to drive in a more responsible fashion.

21. The system of claim 19, wherein the outputted alert signal is an audible alert transmittable to a speaker.

22. The system of claim 19, wherein the outputted alert signal is a visible alert displayable on the display.

23. The system of claim 19, wherein the outputted alert signal is a selectively triggered alarm signal which is generated by a predetermined vehicular state and distance from a road sign.

24. The system of claim 19, wherein a vehicle mounted transmitter is also in communication with at least one motion sensor mounted on a corresponding vehicle and is also adapted and is also adapted to transmit data sensed by said at least one motion sensor which is associated with the corresponding vehicle.

* * * * *